(12) United States Patent
Casden

(10) Patent No.: US 8,740,090 B2
(45) Date of Patent: Jun. 3, 2014

(54) RUGGEDIZED RFID TAG AND READER

(76) Inventor: Martin S. Casden, Calabasas, CA (US)

( * ) Notice: Subject to any disclaimer, the term of this patent is extended or adjusted under 35 U.S.C. 154(b) by 110 days.

(21) Appl. No.: 12/228,428

(22) Filed: Aug. 11, 2008

(65) Prior Publication Data

US 2010/0148968 A1 Jun. 17, 2010

Related U.S. Application Data

(63) Continuation-in-part of application No. 11/179,069, filed on Jul. 12, 2005, now Pat. No. 7,411,507.

(51) Int. Cl.
*G06K 19/06* (2006.01)
(52) U.S. Cl.
USPC .......................................... 235/492; 235/451

(58) Field of Classification Search
USPC .................. 235/451, 492; 340/572.7, 10.1
See application file for complete search history.

(56) References Cited

U.S. PATENT DOCUMENTS

| 4,876,555 | A | * | 10/1989 | Jorgensen | ..................... 343/895 |
| 7,696,883 | B2 | * | 4/2010 | Sumida et al. | ............. 340/572.5 |
| 2002/0190126 | A1 | * | 12/2002 | Benhammou et al. | ........ 235/451 |
| 2004/0074974 | A1 | * | 4/2004 | Senba et al. | .................. 235/492 |
| 2008/0036608 | A1 | * | 2/2008 | Sakama | .................... 340/572.7 |
| 2010/0038426 | A1 | | 2/2010 | Casden | |

* cited by examiner

*Primary Examiner* — Ahshik Kim
(74) *Attorney, Agent, or Firm* — Natan Epstein

(57) ABSTRACT

A radio frequency identification (RFID) transponder tag is contained in and electrically connected to a mechanically rugged metallic tag housing slotted to define a radio frequency antenna, such as a half turn antenna, and sealed with an epoxy filling.

5 Claims, 5 Drawing Sheets

RUGGEDIZED RFID TAG AND READER

This is a continuation-in-part of application Ser. No. 11/179,069 filed Jul. 12, 2005 U.S. Pat. No. 7,411,507.

BACKGROUND OF THE INVENTION

1. Field of the Invention

This invention pertains to the field of radio frequency identification (RFID) readers of the type used in access control systems for reading electronically coded key tags and key cards.

2. State of the Prior Art

RFID reader/writer units may be wall mounted in access control applications where a RFID transponder tag is waved near the reader by persons requesting access. One of the key elements of an RFID (Radio Frequency Identification Device) reader/writer is the antenna. The antenna can be a metal coil or a dipole, depending on the application and other particulars of the system. Radio frequency power is provided to the antenna by appropriate electronic circuits of the reader in a modulated form (the carrier frequency), which is then radiated by the antenna to any proximate RF transponder tag. Radiated power from the transmitting antenna is absorbed by the antenna of the transponder tag where it powers up the electronic chip of the transponder. The chip of the transponder then returns a coded signal detectable by the RFID reader unit. The carrier frequency is usually used as a clock signal for the transponder chip.

The reader communicates with the transponder by modulating the carrier frequency in a patterned or coded manner (usually pulse position modulation). The transponder communicates with the reader/writer using similar methods usually encompassing loading of the carrier signal by shunting the transponder antenna to effect a corresponding variation in the reader/writer antenna. This is usually accomplished using ASK (amplitude shift key), FSK (frequency shift key), PSK (phase shift key) or various other techniques using one or more sub frequencies.

The nature of RF energy in this type of application precludes it from penetrating an electrically conductive metal housing. Therefore, most RFID reader/writer units are designed such that the antenna is covered or enclosed in a non conducting material such as polycarbonate, epoxy or ABS. While this design allows the antenna to send and receive, the relative weakness of these materials leaves the antenna (and anything packaged with it) vulnerable to vandalism and tampering. In the past, installation and maintenance of RFID reader/writers of this type in high risk areas has been problematic.

Others have constructed reader/writers that are packaged with the antenna behind a thin metal plate with one or more narrow slits or holes in a metal plate covering the front of the reader unit. The slit(s) or hole(s) allow the radio-frequency field to propagate beyond the plate from the antenna inside the reader enclosure. However, the metal plate in these designs has thickness limitations, and as a result the added protection is minimal.

An example of such prior art efforts is shown in PCT Publication WO 01/50423 A1 entitled "Electronic Key Reader". In this publication the antenna is a loop mounted behind a front metal plate of the RFID tag reader housing. One or more slots in the front metal plate allow propagation of the radio frequency field emitted by the internal antenna. However, the antenna loop is an element distinct from the metal plate or housing.

As previously explained, the RFID tags, used as identification tokens or keys to actuate RFID readers, generally consist of a radio frequency transponder module connected to a radio frequency antenna. The antenna may be a wire coil or may consist of one or more printed circuit loops. Typically, the transponder module and antenna are encapsulated in plastic for durability, such as in a plastic card. Existing plastic encapsulated RFID tags, while durable for use in operating doorways, elevators and garage gates in normal office, industrial and residential applications, are not sufficiently rugged for certain applications where such tags may be subject to a much greater degree of abuse, impact and mechanical wear, for example, in military applications. A need exists for more robust RFID tags better suited for rugged environments.

SUMMARY OF THE INVENTION

This invention addresses the problem of providing better physical protection against vandalism for RFID reader/writer units by providing the units with stronger housings made of metal rather than plastics.

This invention provides a metal plate cover or housing which also functions as the antenna element of the reader/writer. Since the antenna is also the metal plate cover or housing, which can be virtually any thickness, improved vandal/tamper resistance is achieved without blocking the RF signal. According to this invention, the antenna is integral with the metal cover or housing and not a distinct element as in the aforementioned reference.

A ruggedized RFID tag is provided having a metal tag housing slit or slotted to define a radio frequency antenna, such as a half turn antenna, and has a RFID transponder in the tag housing operatively connected with the antenna. An antenna matching circuit may be provided for operatively interconnecting the transponder with the antenna. The tag housing may be of steel, aluminum or other mechanically strong and electrically conductive metal or alloy.

In one embodiment the metal tag housing comprises two metal housing portions joined mechanically and electrically to each other and containing therebetween the RFID transponder. The metal housing portions may be both slotted to define the antenna, and the metal housing portions may be mechanically and electrically joined by crimping together along the edges of the housing portions. Electrically insulating material such as epoxy may be provided in each slot for closing the slot against entry of foreign matter into the tag housing.

The tag housing may also be partially of electrically conductive material shaped and configured to define a radio frequency antenna integral with the housing.

DETAILED DESCRIPTION OF THE INVENTION

Figure 1:
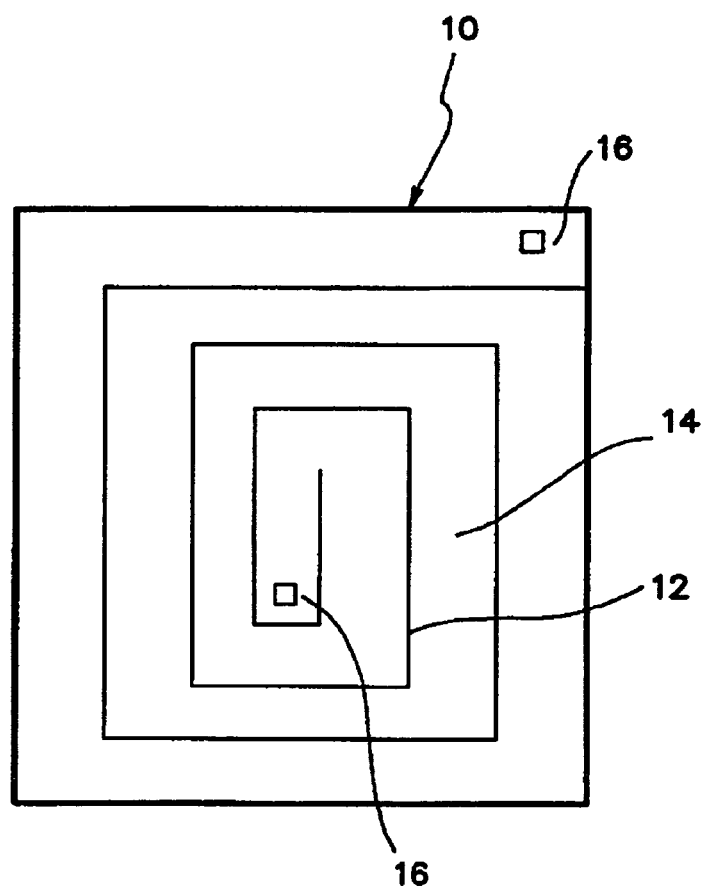
FIG. 1 shows a metal front plate for an RFID reader cut with a rectangular spiral slit to define a spiral antenna integral with the metal plate.

An embodiment of the present invention is illustrated in accompanying FIG. 1, where a metal plate 10 is cut with a rectangular spiral slit 12 to define a spiral antenna 14 integral with the metal plate 10. The plate 10 may be of aluminum, anodized to provide electrical insulation on the aluminum surface. The insulation prevents contact and shorting between adjacent turns of the spiral antenna 14 and also protects users against possible electrical shock in the event of a circuit malfunction of the RFID reader/writer circuits. As indicated in the drawing the opposite ends 16 of the spiral antenna are connected to appropriate points of the RFID reader/writer electronic circuits such that radio frequency energy is delivered to the antenna 14 and radiated therefrom. The metal plate provides an exterior cover, such as a front cover plate, for the circuits of a RFID reader installed in a wall or other protective structure which completes an enclosure with the metal plate 10.

Figure 2A:
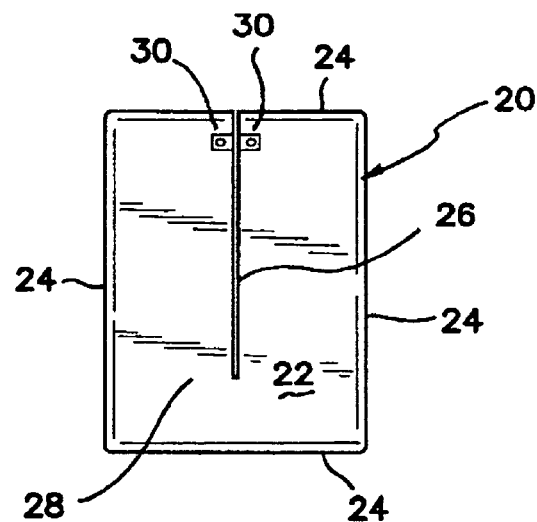
FIG. 2 illustrates a one piece metal housing having both a metal front and metal sides, the metal front cut with a slit to define a single turn radio frequency antenna integral with the metal housing.
Figure 2B:
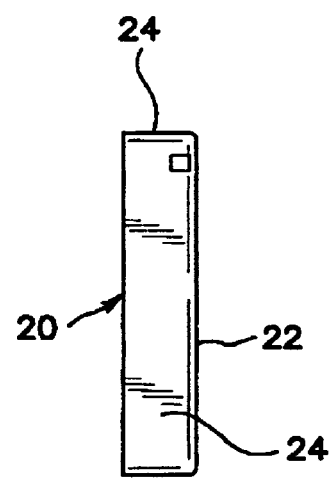
Figure 2C:
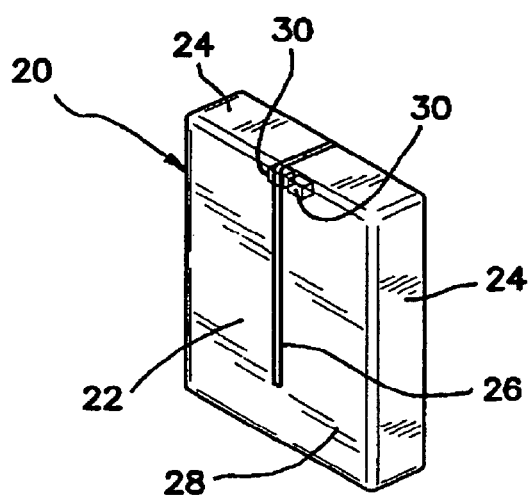

FIG. 2 of the accompanying drawings illustrates another embodiment of the invention where a metal housing 20 having both a metal front 22 and metal sides 24 is cut with a slit 26 to define a single turn radio frequency antenna 28 integral with the housing 20. Appropriate points of the integrated housing/antenna 20, 28, such as the opposite ends 30 of the single turn antenna, are electrically connected to the radio frequency output of the reader/writer circuits for injecting the antenna with RF power. The metal front 22 and metal sides 24 of the housing of FIG. 2 may be formed as single metal piece for greater strength. An appropriate housing back, which may also be of metal, is provided where needed. The metal housing of FIG. 2 is suitable for RFID reader installations where the reader is free standing or is mounted to a wall surface, for example, so that the reader is not otherwise surrounded by protective structure. In such installations the metal housing may fully enclose and protect the circuits and other components of the reader unit.

In both embodiments of FIGS. 1 and 2 the antenna and the metal housing 20 or front plate 10 are a single integrated element which can be made of any suitable thickness to provide a desired degree of physical protection against vandalism of both the antenna and any RFID reader/writer circuits and components housed behind the metal plate 10 or in the metal housing 20.

Figure 3:
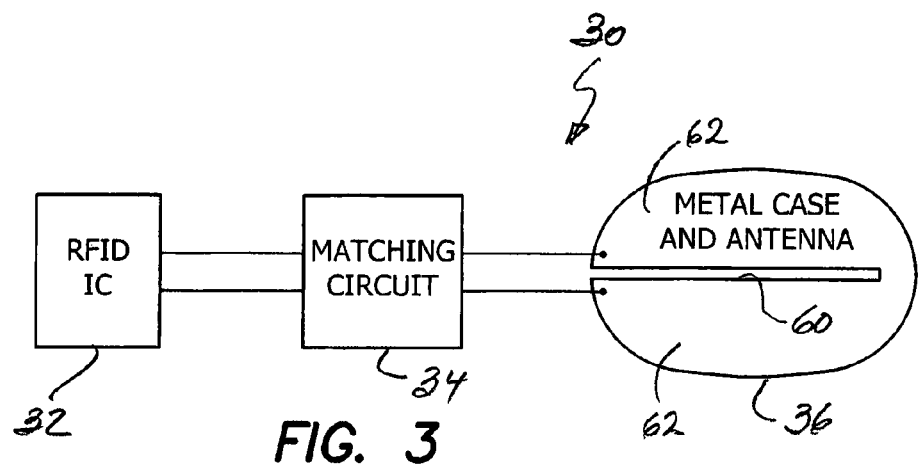
FIG. 3 is a typical electrical block diagram of the ruggedized RFID tag according to this invention.

The ruggedized RFID tag 30 according to this invention is illustrated in FIGS. 3 through 7 of the drawings. FIG. 3 shows in block diagram form the electrical circuit of RFID tag 30, including an RFID transponder circuit 32, an antenna matching circuit 34 and a radio frequency antenna 36.

Figure 4:
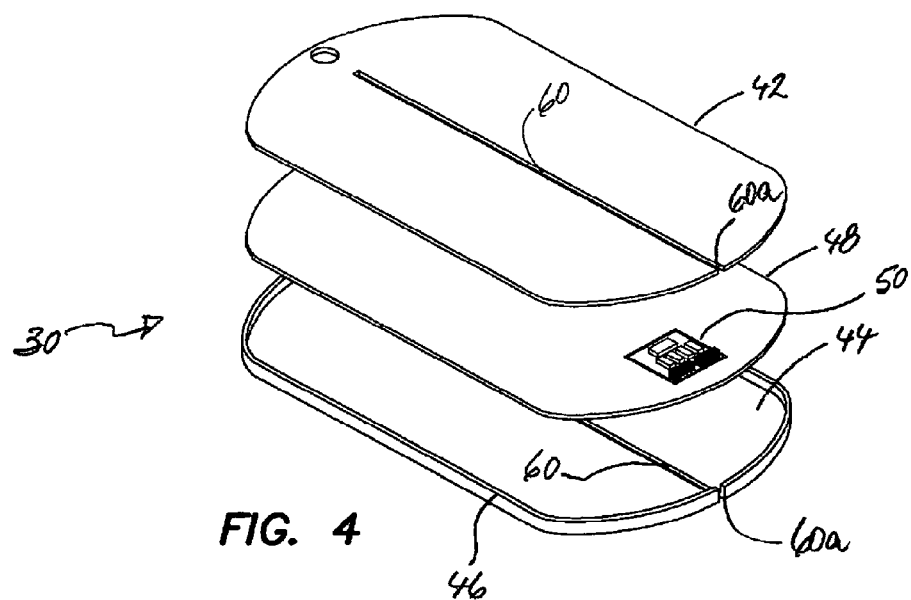
FIG. 4 is an exploded perspective view showing the main components of a typical ruggedized RFID tag according to this invention.

FIG. 4 shows in exploded relationship the main physical components of ruggedized RFID tag 30. Tag 30 has a tag housing 40 comprised of two housing portions, a top housing portion 42 and a bottom housing portion 44. The two housing portions 42, 44 in the illustrated embodiment are flat plates, one of which has a raised lip 46 extending about the edge of the plate.

An electrically insulating spacer plate 48 is contained between housing portions 42, 44 and within raised lip 46. Spacer plate 48 carries an RFID transponder module 50 which includes the RFID transponder circuit 32 and the antenna matching circuit 34.

In the presently preferred embodiment both top and bottom housing portions 42, 44 are metallic, for example, of steel, aluminum or any other mechanically strong metal or alloy with sufficient electrical conductivity for purposes of this application. The insulating spacer 48 may be of ABS (Acrylonitrile Butadiene Styrene), PVC (Polyvinyl chloride), nylon, ceramic or any electrically and mechanically stable electrical insulator.

Figure 5:
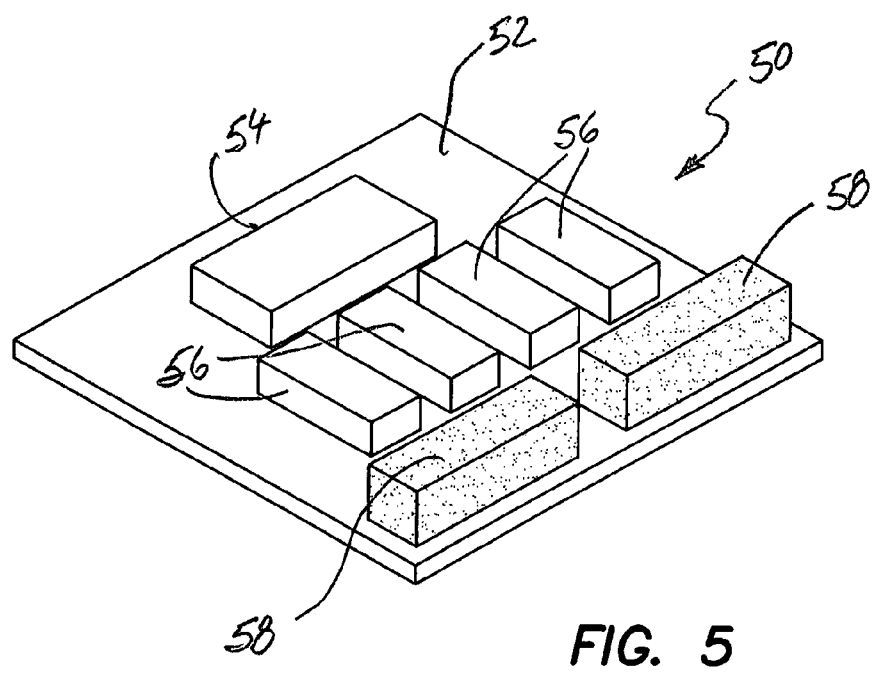
FIG. 5 is a close up view of the RFID transponder module of the tag of FIG. 4.

As seen in FIG. 5, transponder module 50 has a substrate 52 on which are mounted the electrical and electronic components which together make up the RFID transponder circuit 32 and antenna matching circuit 34. The transponder circuit 32 is an integrated circuit die 54, while antenna matching circuit 34 is comprised of matching circuit components 56, which typically are surface mount capacitors. The output of antenna matching circuit 34 terminates in connections to a pair of elastomeric connectors 58 mounted on substrate 52. These connections may be by way of conductive traces on substrate 52 or by other suitable means.

Each of the top and bottom housing portions 42, 44 are slit to define a radio frequency antenna. In the illustrated embodiment, housing portions are slit by means of a center slot 60 extending partially along a longitudinal dimension of the housing portions and open at one end of each housing portion to divide and define two equal lobes 62 on each housing portion 42, 44.

Figure 7:
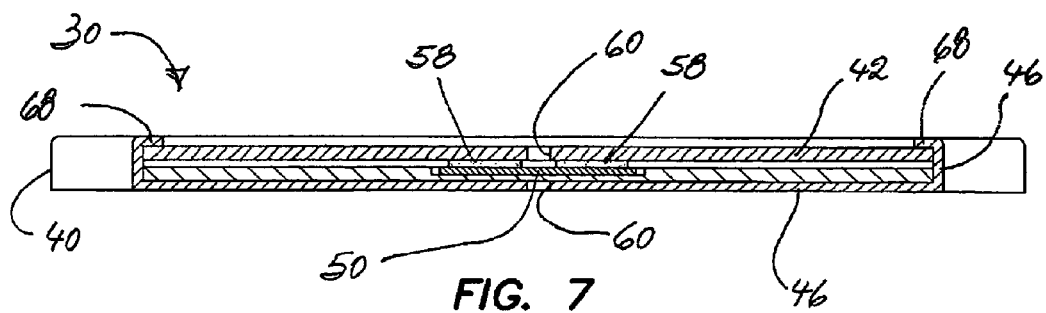
FIG. 7 is a cross section taken along line 7-7 in FIG. 6 showing how the RFID module is captive between the housing portions and the elastomeric connectors contact the inside surface of the top housing portion.
Figure 6:
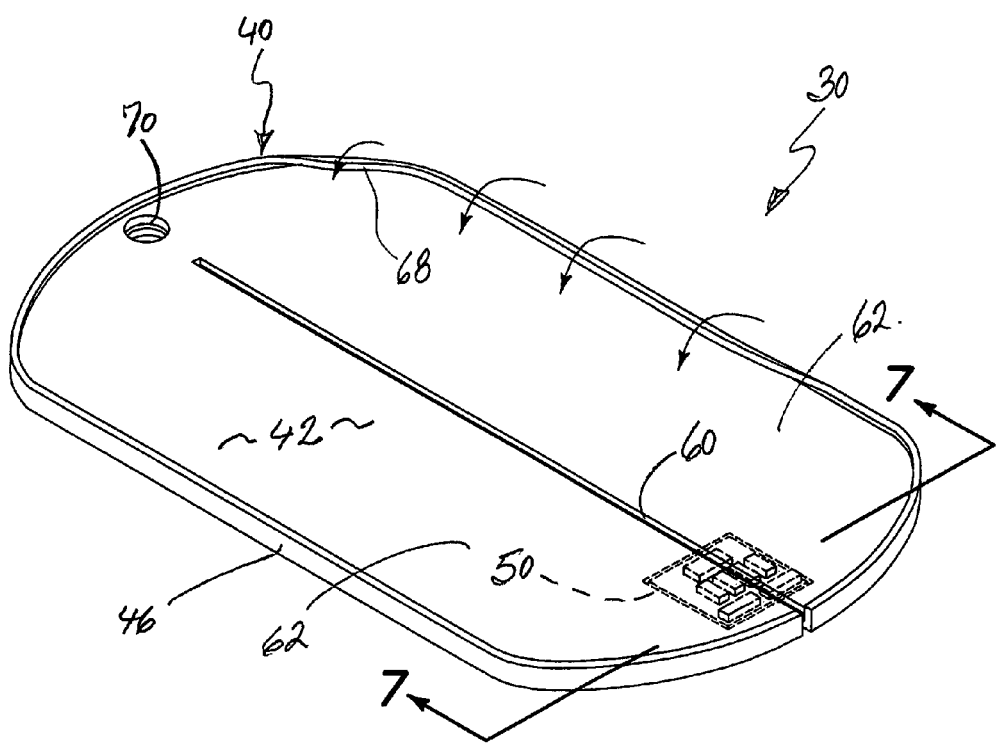
FIG. 6 is a perspective view of the assembled tag of FIG. 4 showing how the lip of the bottom housing portion is crimped over the top housing portion and also indicating the location of the RFID transponder in phantom lining.

In an assembled condition of tag 30 depicted in FIGS. 6 and 7 the top and bottom housing portions 42, 44 are joined electrically and mechanically to each other, for example, by mechanically crimping the raised lip 46 of the bottom housing portion over the top housing portion 44. The crimp 68 suggested by the arrows in FIG. 6 establishes an electrical connection extending along the crimped together edges of the housing portions 42, 44 and also makes a strong mechanical joint between the two housing portions. Other methods of mechanically joining and electrically connecting the housing portions 42, 44, such as welding or soldering, among others, may also be used. The top and bottom housing portions 42, 44 are joined with the corresponding slots 60 overlaid in register with each other, that is, with the open ends 60a of slots 60 located on the same end of the tag housing 40, so that electrically the stacked slots 60 extend through the thickness of the assembled tag housing, and the two electrically connected slotted housing portions 42, 44, i.e. the tag housing, acts as a single radio frequency antenna 36. The slots 60 define a half turn radio frequency antenna 36 which is driven via the antenna matching circuit 34, so that the tag housing 40 also becomes the antenna 36 for the RFID transponder 32 contained in the housing. The tag housing 40 thus serves the dual function of mechanically containing and protecting the RFID transponder 32 and of receiving and radiating RFID radio frequency signals between RFID transponder 32 and a suitable RFID tag reader unit.

In an assembled condition of the tag 30, the spacer plate 48 lies on the bottom housing portion 42 within raised lip 46. The substrate 52 is affixed to the spacer plate 40 by suitable means, such as an adhesive. The top housing portion 42 lies over the spacer plate 48 and within raised lip 46 of the bottom housing portion 44. The two housing portions 42, 44 are assembled with the spacer 48 in-between to form a three layer stack, as best seen in FIG. 7. In the assembled condition the inside surface 64 of top housing portion 44 presses down on the two elastomeric connectors 50, so that each connector 50 establishes an electrical connection between one output side of the antenna matching circuit 34 and a corresponding lobe 62 of the antenna defined by top housing portion 42. The elastomeric connectors 50 may be commercially available silicone elastomeric connectors of a type well known in the field.

In the assembled tag 30 it will be desirable in most applications to fill the slots 60 with a nonconductive but durable material, such as epoxy, to seal the interior of the tag 30 against entry of moisture and foreign matter. Alternatively, raised ridges may be formed integrally with the spacer plate 48 such that the raised ridges align with and fill the slots when the top and bottom housing portions 42, 44 are stacked with the spacer plate 48 between them, thereby closing the slots against entry of foreign matter. A hole 70 may be provided through the housing 40 for passing a neck chain or the like.

In one embodiment, the dimensions of tag housing 40 may be 0.5 inch wide or wider, 1.0 inch long or longer, and 0.1 inch thick. In other embodiments, the tag housing may be between 0.3 inches and 2 inches in width, between 0.5 inch and 3 inches in length, and between 0.05 and 0.25 inch in thickness. Still larger tag dimensions may be found suitable for certain applications, even double or triple the preceding dimensions, for example.

The ruggedized tag 30 of this invention is suitable for operation at the RFID radio frequency of 13.56 MHz. However, it may be adapted for operation at other frequencies as well. The design and constructions of antenna matching circuit 34 is well understood in the RFID field and need not be explained in greater detail here.

The housing portions 42, 44 may be of materials other than metal provided at least a part of one housing portion is electrically conductive so as to define a radio frequency antenna operative at the relevant RFID frequency. For example, it is contemplated that bottom housing portion 44 could be of a mechanically strong but non conductive material, such as a hard ceramic, and only the top housing portion is metallic and slit or slotted for defining an antenna. It is also contemplated that both housing portions could be of a nonconductive but mechanically rugged material such as a hard ceramic, and a metallic layer deposited or applied to the interior, exterior or both of the housing portions so as to define an antenna. Antenna 32 may take forms other than the half turn antenna shown in the drawings, and by appropriate slitting or slotting of the tag housing an antenna having one or two turns or a spiral antenna could be defined on tag housing 40.

Other methods and means for making the electrical connection between the radio frequency transponder output and the antenna may be used in addition to or in lieu of silicone elastomeric connectors. For example, conductive epoxy may be used for this purpose, among other possibilities.

While particular embodiments of the invention have been described and illustrated for purposes of clarity and example, it will be understood that many changes, substitutions and modifications will be apparent to those having only ordinary skill in the art without thereby departing from the scope of the invention as defined by the following claims.

What is claimed as new is:

1. In combination, a housing made at least partially of electrically conductive material, said housing shaped and configured to define a radio frequency radiating antenna including a pair of antenna lobes formed integrally with said housing, an RFID transponder circuit contained within and mechanically protected by said housing, and an antenna matching circuit having a pair of outputs each electrically connected to a corresponding one of said antenna lobes operatively connecting said transponder circuit with said antenna.

2. The combination of claim 1 wherein said housing is made of metal.

3. The combination of claim 1 wherein said housing is made of relatively thick material for substantially protecting said radio frequency circuits from damage caused by physical abuse of said housing.

4. The combination of claim 1 wherein said housing is slotted for defining said antenna lobes.

5. The combination of claim 1 wherein said housing has one or more slots for defining said antenna lobes and said one or more slots are filled with nonconductive material for closing said slots against entry of foreign matter into said housing.

* * * * *